Dec. 9, 1930.  J. A. PRIOR  1,784,793
DOUBLE AUTOMATIC CLUTCH
Filed Aug. 13, 1929   4 Sheets-Sheet 1
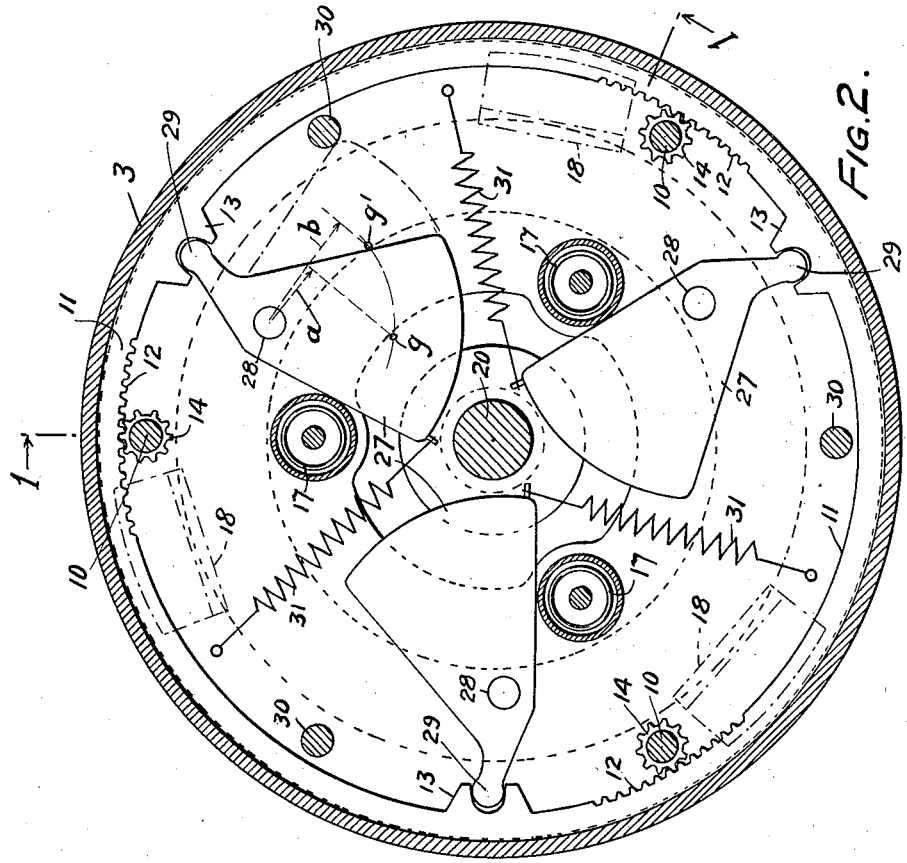
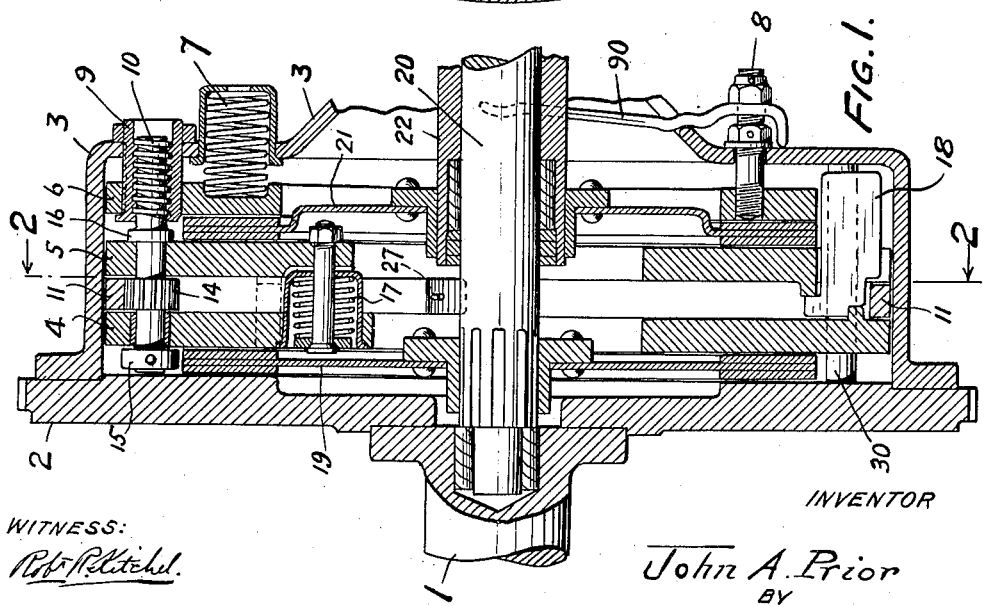
WITNESS:
INVENTOR
John A. Prior
BY
Augustus B. Stoughton
ATTORNEY.

Dec. 9, 1930.  J. A. PRIOR  1,784,793
DOUBLE AUTOMATIC CLUTCH
Filed Aug. 13, 1929  4 Sheets-Sheet 2

WITNESS:

INVENTOR

John A. Prior
BY
Augustus B. Stoughton
ATTORNEY.

Dec. 9, 1930.    J. A. PRIOR    1,784,793
DOUBLE AUTOMATIC CLUTCH
Filed Aug. 13, 1929    4 Sheets-Sheet 3

WITNESS:

INVENTOR
John A. Prior
BY
Augustus B. Stoughton
ATTORNEY.

Dec. 9, 1930. J. A. PRIOR 1,784,793
DOUBLE AUTOMATIC CLUTCH
Filed Aug. 13, 1929 4 Sheets-Sheet 4
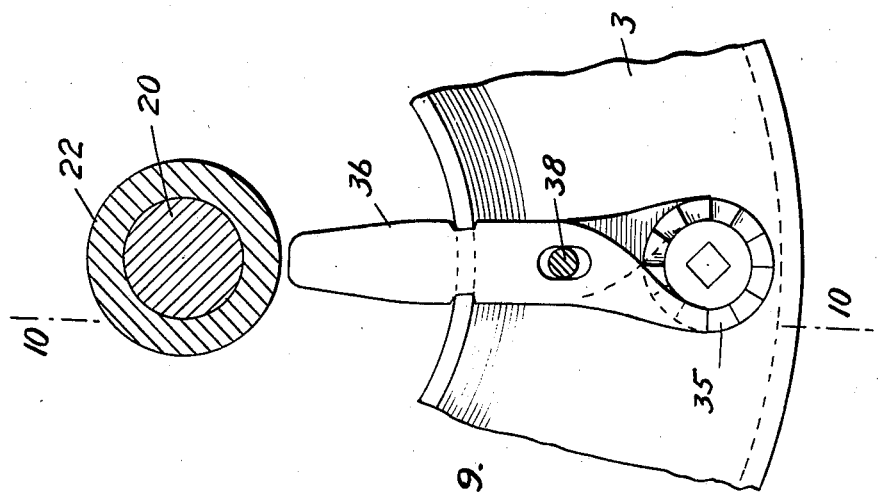
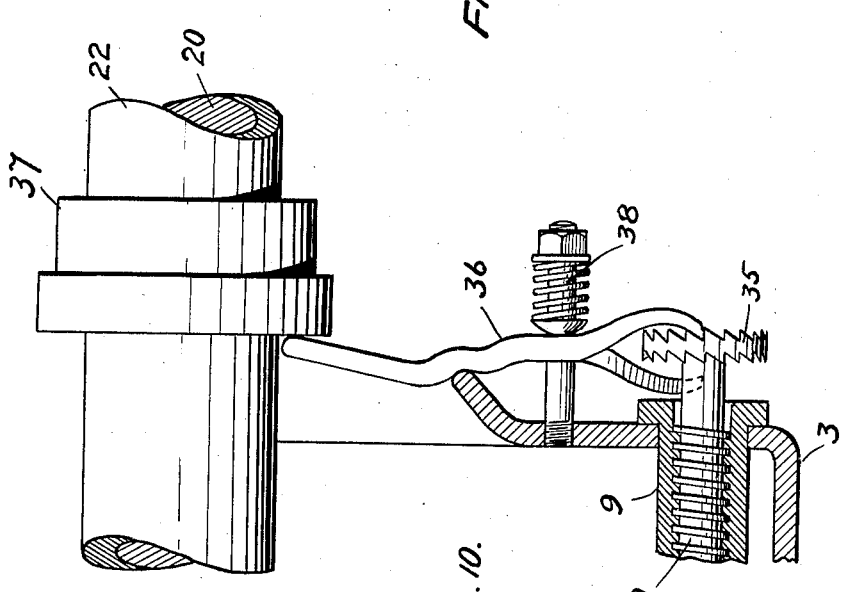
WITNESS:
INVENTOR
John A. Prior
BY
Augustus B. Stoughton
ATTORNEY.

Patented Dec. 9, 1930

1,784,793

UNITED STATES PATENT OFFICE

JOHN A. PRIOR, OF PHILADELPHIA, PENNSYLVANIA, ASSIGNOR OF ONE-HALF TO SAMUEL P. HOWE, OF CAMDEN, NEW JERSEY

DOUBLE AUTOMATIC CLUTCH

Application filed August 13, 1929. Serial No. 385,493.

An object of my invention is to provide an automatic clutch having two driven members one of which is in series with a train of gears between the driven member and the driven shaft. This clutch is particularly adapted for use with automotive vehicles especially with those driven by an internal combustion engine.

Another object of my invention is to provide means for engaging either of the driven members with the driving member and for preventing simultaneous engagement of both driven members.

A still further object of my invention is to provide means for automatically shifting the engagement from either driven member to the other at predetermined speeds.

A still further object is to provide means for establishing a difference between the speeds at which the automatic shifting occurs so that the shifting from the geared driven member to the ungeared driven member will occur at a higher speed than the opposite shift. The purpose of this is to avoid the disagreeable retarding effect of dropping into a lower gear at considerable speed and to insure the immediate and positive engagement of the ungeared driven member.

Yet another object of my invention is to provide means of completely disengaging the clutch by the usual foot pedal under any condition of operation.

Yet another object of my invention is to provide means by which the operator can modify the automatic shifting action for such purposes as using the geared connection for hill-climbing at speeds above that at which the automatic shifting to high gear would normally occur or for preventing engagement of the clutch to the geared connection when the motor speed is not sufficiently high.

For a more complete exposition of my invention reference may be had to the annexed drawings and specification at the end whereof the invention will be specifically pointed out and claimed.

Figure 1 consists of a cross section through the clutch on the line 1—1 of Figure 2.

Figure 2 consists of a cross section on the line 2—2 of Figure 1.

Figures 6, 7:
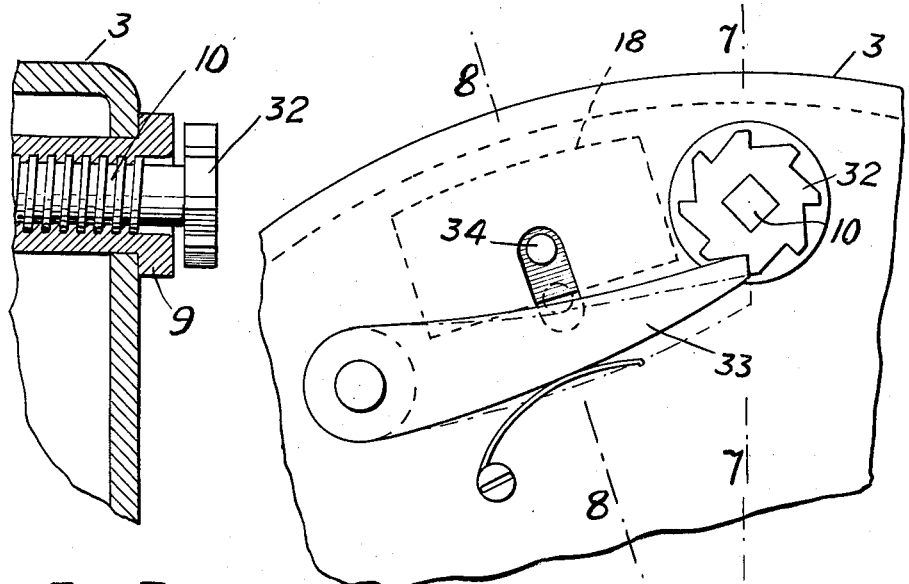
Figure 8:
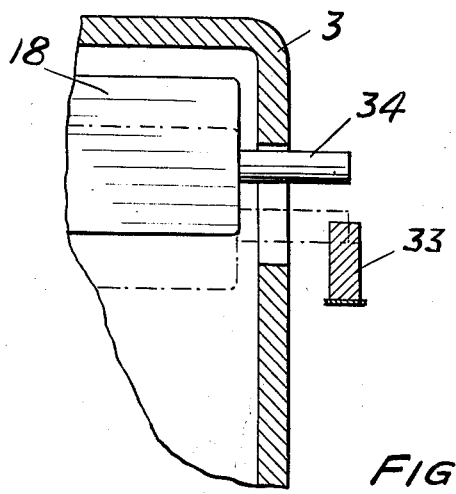

Figures 6, 7 and 8 relate to a modification which permits the operator to control the shift from the direct to the geared connection, Figure 6 being a fragmentary cross sectional view similar to Figure 2.

Figure 7 is a cross section on the line 7—7 of Figure 6.

Figure 8 is a cross section on the line 8—8 of Figure 6.

Figures 9 and 10 relate to another modification in which the operator may control the shift in either direction, Figure 9 being a partial cross section similar to Figure 2.

Figure 10 is a partial cross section on the line 10—10 of Figure 9.

In the drawings there is shown a driving shaft 1 which carries at its rear end driving disk 2 to the rear face of which is attached driving housing 3. Mounted to rotate with driving disk 2 are driving plates 4 and 5. These plates are attached to driving disk 2 in any suitable manner such as by splines or pins so as to rotate with driving disk 2 but so as to be free to move longitudinally with respect thereto. Also forming part of the driving mechanism is backing plate 6 which is pressed upon by springs 7 interposed between driving housing 3 and backing plate 6. Backing plate 6 carries declutching studs 8 therein. These studs project through the rear face of driving housing 3 so as to receive pivotally mounted declutching fingers 90. These declutching fingers 90 are adapted to be operated in any suitable manner from the customary foot pedal.

Also mounted in driving housing 3 are nuts 9 which cooperate with shifting studs 10 which tend to shift, automatically, engagement from one driven member to another in a manner which will be hereinafter more fully described. Nuts 9 are longitudinally slidably mounted in driving housing 3 and backing plate 6 but are held against rotation in the housing or in backing plate 6 by means of flattened sides, splines or any other suitable device.

For the purpose of driving shifting studs 10 there is provided shifting ring 11 which is provided at parts of its inner circumference with teeth portions 12 and forked portions 13. Shifting studs 10 carry at a portion of their length pinion gears 14 adapted to cooperate with the teeth of the shifting ring 11. Shifting studs 10 also carry collars or shoulders 15 and 16 which are spaced apart the distance between the inner faces of the driven members 19 and 21.

Driving plates 4 and 5 are drawn together by springs 17 when centrifugal weights 18 are inoperative. Also interposed between driving plates 4 and 5 are centrifugal weights 18. Interposed between driving disk 2 and driving plate 4 is driven member 19 which is directly mounted on driven shaft 20.

Figure 4:
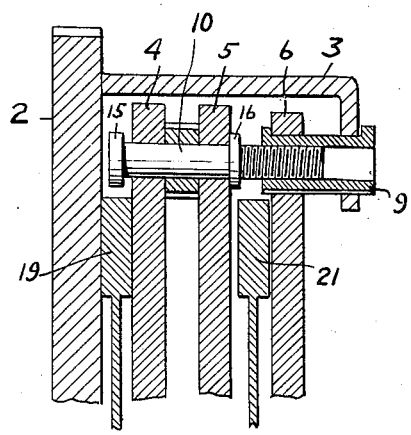
Figure 4 is a similar view showing the ungeared driven member engaged.
Figure 3:
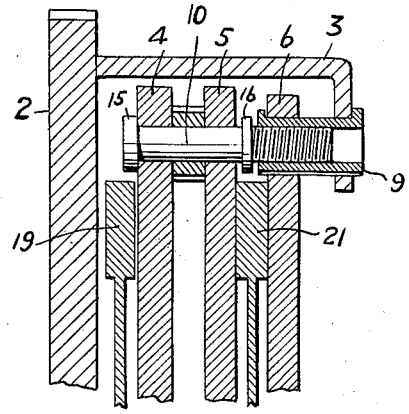
Figure 3 is a detailed cross section showing the geared driven member engaged corresponding to the upper part of Figure 1.
Figure 5:
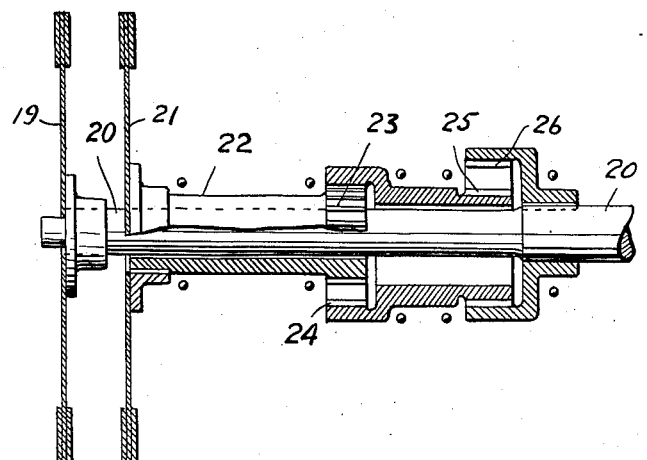
Figure 5 is a diagrammatic view partially in cross section showing the driven shaft.

Interposed between driving plate 5 and backing plate 6 is driven member 21 which is mounted on driven sleeve 22. Between driven sleeve 22 and driven shaft 20 are interposed gears 23, 24, 25 and 26 which may, for the purposes of silence and efficiency, be made of the internal type as shown in Figure 5. Driven sleeve 22, gears 24, 25 and 26 rotate in ball bearings as indicated by the balls shown in Figure 5.

For the purpose of actuating shifting studs 10 there are provided shifting weights 27 as shown most clearly in Figure 2. Shifting weights 27 are pivoted at 28 and have one end 29 engaged in forks 13 on shifting ring 11. The opposite ends of shifting weights 27 are retracted by springs 31 and when in extreme position are adapted to be stopped against pins 30.

The operation of my device is briefly as follows: Starting from the neutral position shown in Figure 1 in which the driven members 19 and 21 are both disengaged the driving shaft 1 is caused to rotate from any suitable source of power, such as an internal combustion engine. Driving disk 2, driving plates 4 and 5, backing plate 6, nuts 9, shifting studs 10, centrifugal weights 18 and shifting weights 27 all rotate together as a driving unit. When the speed of rotation reaches a predetermined point centrifugal weights 18 move outward tending to push driving plates 4 and 5 in opposite directions into engagement with driven members 19 and 21. If it is not desired to incorporate the declutching feature in the device centrifugal weights 18 may be omitted and the driving plates 4 and 5 subjected to the pressure of springs tending to thrust them apart.

In the device as shown collars 15 on driving studs 10 prevent the engagement of driving plate 4 with driven member 19 while driving plate 5 engages driven member 21 and forms a connection from driving shaft 1 to driven shaft 20 through sleeve 22 and gears 23, 24, 25 and 26. Backing springs 7, by their tension determine the amount of torque which can be transmitted to driven member 21.

When the speed of rotation of the clutch has reached a predetermined amount shifting weights 27 rotate about pivot 28 against the tension of springs 31 due to centrifugal force. Due to the engagement of ends 29 with forks 13 shifting rings 11 are caused to rotate in counterclockwise direction, as seen in Figure 2, and by means of pinions 14 causes shifting studs 10 to move towards the left, as seen in Figure 1, and thereby carry driving plate 5 out of engagement with driven plate 21 and carry driving plate 4 into engagement with driven member 19, thus coupling driven shaft 20 directly to the driving shaft 1.

Should the speed of the driving shaft 1 and the clutch, as a whole, fall below a certain predetermined amount centrifugal force will be insufficient to hold the shifting weights 27 against the tension of springs 31 and these weights will shift in an opposite direction or clockwise, as seen in Figure 2, and thereby cause driving plate 4 to disengage member 19 and cause driving plate 5 to engage driven member 21.

It is desirable that the shift of engagement from driven member 21 to driven member 19 shall take place at a higher speed than the shift of engagement in the opposite direction because otherwise there would be a tendency for the car to go into reduced gear while traveling at considerable speed. This would have a disagreeable retarding effect upon the car. Also as soon as the shift up, from the lower gear to the direct drive, is completed (or even partially completed), the engine speed is reduced, so that the clutch tends to drop back to the lower speed or to slip unless definite means are used to prevent this. It is, therefore, desirable to delay the shift up until a surplus of centrifugal force is available to hold the direct connected driven member firmly engaged, and to delay the shift down until the speed has dropped to the point at which the centrifugal weights 18 automatically cause both driving plates 4 and 5 to release. This is accomplished by so proportioning the center of gravity $g$ of the shifting weights 27 with respect to the pivots 28 that upon movement of the shifting weights 27 to outer position the centrifugal force acts upon the center of gravity of the shifting weights with a longer lever arm than when the weights are in initial position. This is shown in Figure 2 wherein the centrifugal force acts on the center of gravity $g$ of the shifting weights 27 with the lever arm $a$ when the shifting weights are in their retracted position. This lever arm shifts to the length $b$ when the shifting weight has moved to its outer position so that its center of gravity is at $g^1$, as shown in dotted lines in Figure 2.

In order that the clutch may be manually released at any time there are provided declutching fingers 90 adapted to be actuated by a linkage (not shown) by a customary foot pedal so as to retract backing plate 6 by means of declutching studs 8. Retraction of backing plate 6 permits the rearward movement of nuts 9 and shifting studs 10 so as to permit the disengagement of driving plate 4 if that plate happens to be in engagement with driven member 19. If driving plate 5 is in engagement with driven member 21, the retraction of backing plate 6 breaks this engagement.

Figures 6, 7 and 8 relate to a modification having means for permitting the operator to control the time at which the shift from the direct connection to the geared connection takes place. It is desirable to provide such a connection so that when the speed of the motor drops below the predetermined point at which the shift would take place, the shifting means may be prevented from operating if so desired. Means for preventing the shift from direct connection to geared connection consists of a ratchet 32 mounted on the end of one or more of the shifting studs 10. Such a ratchet 32 is engaged by the pawl or latch 33 while the directly connected clutch is in operation. This pawl permits counterclockwise rotation of the shifting stud 10 (in this particular arrangement of the mechanism) so that the automatic shift from gear drive to direct drive is always permitted, but the opposite shift is prevented while latch 33 engages the ratchet 32. When the speed of the driving shaft drops sufficiently, the main centrifugal weights 18 move inward, releasing the clutch. Pins 34 on one or more of the weights 18 then strike latch 33, disengaging it from the ratchet 32, permitting stud 10 to turn clockwise so that the shift down is made automatically.

Figures 9 and 10 show another modification in which the movement of the shifting stud 10, in either direction, is under control of the operator. In this modification shifting studs 10 have double faced ratchets 35 mounted thereon. These ratchets may be mounted on one or more of the shifting studs 10. Cooperating with these ratchets are double faced pawls or latches 36 which are stressed by springs 38 into engagement with a face of the ratchet 35 so as to prevent counterclockwise rotation of the studs 10 (in this particular modification). In general, the pawl or latch 36 is spring pressed into the position in which it prevents the movement of studs 10 which causes the shift from direct to geared connection. The inner end of pawls or latches 36 are adapted to be engaged by a collar 37 which is slidably mounted on the driven shaft 20 so as to be engaged by a shifting fork (not shown) which is under the control of the operator. Upon movement of the collar 37 the latch or pawl 36 is shifted so that the opposite end comes into contact with opposite latch line 35 and thereby prevents movement of the stud 36 in the direction which causes a shift from the geared to the direct connection. In this particular modification, collar 37 is the clutch throw-out bearing, actuated by the clutch pedal.

The use of this device in operation is as follows. To drop back to gear drive at, for example, thirty miles per hour the driver first declutches with the throttle closed, letting the engine speed drop sufficiently to cause automatic shifting to the geared drive. He then speeds-up the engine still holding the clutch pedal clear down. Latch 36 now being in engagement with the lower or forward ratchet 35, which prevents the automatic shift back to high and the pressure of the ratchet teeth on the latch holds the pawl by friction, so that the clutch may now be reengaged. In return to high, the same procedure is followed except that the clutch pedal is not pushed down to the limit. In a similar manner latch 36 is held in engagement with ratchet 35 by spring 38 so as to prevent the automatic shifting from direct to geared connection unless the latch 36 is freed by pressure of the collar 37.

If so desired a single pawl may be used instead of the double pawl to affect the control of the shifting stud in one direction if it is only desired to control the shifting of the engagements in one direction.

The foregoing is merely one embodiment, with modifications, of my invention in the practice whereof I do not intend to be limited save as the scope of the prior art and the attached claims may require.

I claim:

1. A clutch including a driving member, a driven shaft, a driven member directly connected to said driven shaft, a second driven member, gearing interposed between said second driven member and said driven shaft, centrifugal means for shifting engagement between said second driven member and said driving member to engagement between said driving member and said driven member at a higher speed of rotation than the shift in the opposite direction.

2. A clutch including a driving member, a driven shaft, a driven member directly connected to said driven shaft, a second driven member, gearing interposed between said second driven member and said driven shaft, centrifugal means for shifting engagement of said second driven member and said driving member to engagement with said driven member and said driving member at a predetermined speed, and means for preventing the operation of said shifting means at said predetermined speed.

3. A clutch comprising a driving shaft, a driving disk attached thereto, driving plates mounted on said driving disk so as to be rotatable therewith and so as to be axially movable in respect thereto, a driving housing mounted on said driving disk, nuts mounted in said driving housing so as to be non-rotatable therein and so as to be axially movable with respect thereto, shifting studs having shouldered engagement with said driving plates and screw-threaded engagement with said nuts, pinion gears on said shifting studs, a shifting ring having teeth cooperate with the pinions on said shifting studs, a driven member, a driven shaft attached to said driven member, a second driven member, and gears interposed between said second driven member and said driven shaft.

4. A clutch including a driving shaft, a driving disk attached thereto, a driving housing attached to said driving disk, nuts non-rotatable but slidably mounted in said driving housing, a pair of driving plates mounted on said driving disk so as to rotate therewith and so as to be axially slidable in relation thereto, centrifugal operable weights mounted with relation to said driving plates so as to separate said plates at a certain predetermined speed of rotation, shifting studs having shouldered engagement with said driving plates and having screw-threaded engagement with said nuts, pinions mounted on said shifting studs, a shifting ring having teeth portions in mesh with said pinions, centrifugal operable shifting weights for shifting said shifting ring in one direction at a predetermined speed, springs opposing the centrifugal action of said shifting weights and adapted to shift said shifting ring in the opposite direction at a lower predetermined speed than the speed at which the shift in the opposite direction takes place, a driving shaft, a driven member directly connected to said driving shaft, a second driven member, and gears interposed between said second driven member and said driven shaft.

5. A clutch including a driving member, a driven shaft, a driven member mounted on said driven shaft, a second driven member, gearing interposed between said second driven member and said driven shaft, a shifting stud for shifting engagement between said driving member and either of said driven members, a ratchet mounted on the end of said shifting stud, a pawl adapted to cooperate with the ratchet, and a collar for actuating said pawl.

6. A clutch including a driving member, a driven shaft, a driven member mounted on said driven shaft, a second driven member, gearing interposed between said second driven member and said driven shaft, a shifting stud for shifting engagement between said driving member and either of said driven members, a double faced ratchet mounted on the end of said shifting stud, a double ended pawl adapted to cooperate with the ratchet, a spring urging one face of the pawl into engagement with one of the ratchets, and a collar for actuating said pawl.

JOHN A. PRIOR.